United States Patent
Olson

[19]

[11] Patent Number: 5,704,076
[45] Date of Patent: Jan. 6, 1998

[54] CONTROLLED TOILET FLUSHING SYSTEM

[76] Inventor: Olof H. Olson, 729 - 12th Ave. P.O. Box 553, North Branch, Minn. 55056

[21] Appl. No.: 491,562

[22] Filed: Jun. 16, 1995

[51] Int. Cl.⁶ ........................................ E03D 1/14
[52] U.S. Cl. ........................... 4/325; 4/314; 4/415
[58] Field of Search .................... 4/314, 392, 393, 4/402, 403, 415, 325, 324

[56] References Cited

U.S. PATENT DOCUMENTS

| | | | |
|---|---|---|---|
| 2,059,749 | 11/1936 | Rosewood | 4/402 X |
| 3,296,630 | 1/1967 | Clark | 4/393 X |
| 3,984,877 | 10/1976 | Kirby | 4/314 |
| 4,145,775 | 3/1979 | Butler | 4/415 |
| 4,841,580 | 6/1989 | Agostino | 4/402 X |
| 5,142,710 | 9/1992 | Olson | 4/325 |

*Primary Examiner*—Charles E Phillips

[57] ABSTRACT

A toilet tank flush valve for use in the demand mode, and which includes a discharge control and closure valve for controlling the flow of water from the tank or reservoir to the bowl, and with the valve further having a generally cylindrical configuration with an open top and a closed bottom defining a water retaining chamber, with the chamber extending upwardly above the discharge drain opening and being designed to retain a fill of a certain first quantity of water. Pivotal opening of the valve, while tipping a portion of the water outwardly of the enclosure, will not discharge more than about 70% of the volume of water retained within the enclosure so as to permit a more positive seal of the valve onto the discharge drain opening. A stopper installed in the end of the tubing that goes into the hole in the standpipe from the ballcock or a plastic tubing stopper with an internal bore that fits on the fitting on the top of the ballcock outlet stops a large amount of water from going into the toilet bowl through the standpipe by about 60% saving. The toilet tank water level guage allows the operater of the toilet to know when to release the flush lever on the toilet tank when the collar or washer goes down with the rod and rests on the top of the rod guide to shut off the water from going out of the toilet tank through the drain at the bottom of the toilet tank when there is enough water going out of the toilet tank to get a flush.

1 Claim, 4 Drawing Sheets

CONTROLLED TOILET FLUSHING SYSTEM

BACKGROUND OF THE INVENTION

The present invention relates generally to a toilet tank water saving flush valve and a plastic tubing stopper more particularly to such a valve which is arranged to save and conserve quantities of water through operation of the demand mode. The water saving flush valve of the present invention is arranged for use in systems where the user may choose and select the quantity of water desired to flow from the toilet tank to the bowl by holding and actively maintaining the water saving flush valve in an open disposition.

Water, as a resource, is becoming less and less available through consumption. Fresh water is a highly necessary resource, and it is recognized that techniques for limiting quantities of its use may provide significant benefits to society. For example, it has been recognized that the population growth in certain areas of this country and indeed the world is limited by virtue of the availability of a supply of fresh water.

Toilet tanks, in their usual and normal operation, utilize substantial quantities of water and as such may prove to be wasteful. While water for such purpose is a necessity, the quantities utilized are frequently in substantial excess of those required. One technique for appropriately limiting a quantity of water being used on each flush of a toilet is to utilize a demand valve wherein the user can control the quantity to that which is required, rather than simply providing a substantial excess.

In order to properly function, toilet tanks must receive a charge of water at a relatively rapid rate in order to provide appropriate flushing action. In order to initiate such action, however, only a modest quantity of water is initially required, and the normal syphon action of the bowl will remove an adequate quantity of waste water from the bowl. By utilizing a demand valve which permits an adequate impulse or flow of water, such syphoning action will occur in the normal sense, and the bowl may be properly filled and recharged with an adequate quantity of fresh water. In accordance with the present invention an improved toilet tank water saving flush valve is provided which is designed to provide improved sealing and improved closure with a positive sealing action. The discharge control and the water saving closure valve of the present invention is designed to function with conventional designed toilet tanks and thus normal application and retrofitting may occur. The device is designed to provide for immediate and positive closure and thus is designed to reduce or eliminate leakage of water from the reservoir to the bowl.

The improved discharge control and the water saving closure valve of the present invention has a generally cylindrical configuration with an open top and a closed bottom and with an outer diameter such that the inner diameter of the discharge line from the bowl is immediately adjacent to the outer diameter of the walls of the control and the water saving closure valve. Additionally the control and the water saving closure valve has a generally inwardly formed enclosure surface extending about the periphery thereof and with sidewalls extending upwardly so as to enlarge and increase the water retaining volume of the valve and thus enhance its sealing properties and action. In other words the discharge control and the water saving closure valve of the present invention is designed with a water retaining chamber and wherein the chamber remains substantially full even when the valve is pivoted to its open position. For appropriate action it has been found that the chamber sidewalls are of a sufficient height so that the valve will retain approximately 70% of the volume of the chamber whenever it is opened with the weight of the water assisting in the closure of the valve whenever opened to commence the flow of water from the reservoir into the bowl.

As indicated, the discharge control and closure valve of the present invention is a water conserving valve, and functions in demand mode whenever operated. In this arrangement, the toilet bowl is not flushed in the conventional fashion each time it is used, but is provided with a quantity of water sufficient to swirl the waste material in the toilet bowl sufficiently to be diluted. In this arrangement, the trip lever is actuated and held until a sufficient flow of water has flowed from the reservoir to the bowl to create a swirling action which dilutes the liquid waste. The trip lever is then released to interrupt the flow of water from the reservoir to the bowl, whereupon liquid waste present in the toilet bowl is sufficiently diluted so that it does not require a full flush.

Therefore, it is a primary object of the present invention to provide an improved toilet tank flush valve which operates in the demand mode, and which is provided with a reservoir or chamber which is designed to retain a quantity of water therein so as to improve the sealing and closure functions of the valve.

It is yet a further object of the present invention to provide an improved toilet tank flush valve which is designed to operate in the demand mode, and which is provided with a water retaining chamber to improve the sealing and closure action of the valve when opened, and converted to the closed disposition.

Other and further objects of the present invention will become apparent to those skilled in the art upon a study of the following specification, appended claims and accompanying drawings.

DESCRIPTION OF THE PREFERRED EMBODIMENT

Figure 1:
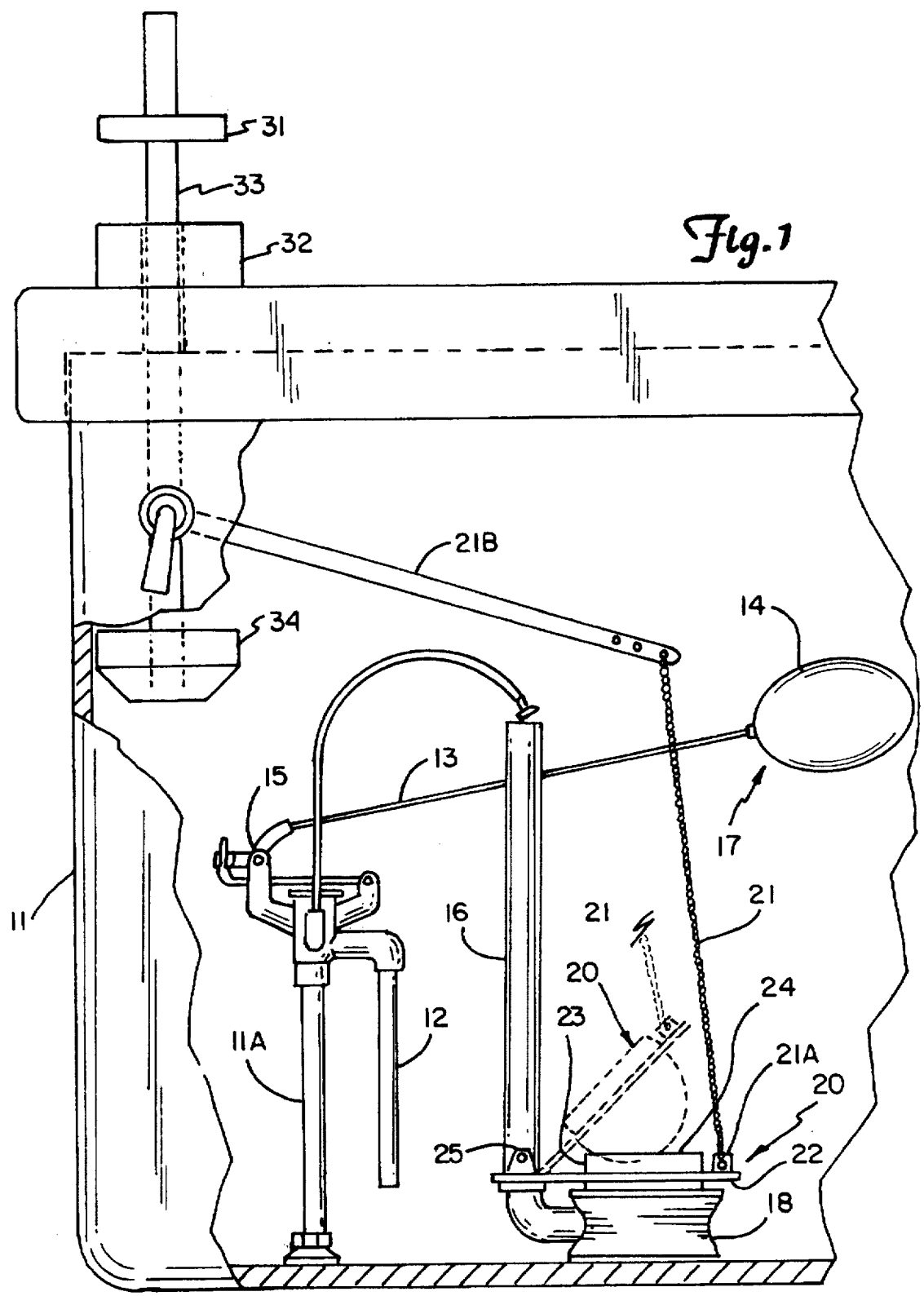
FIG. 1 is a front elevational view, partially broken away, and illustrating the interior of a conventional toilet tank reservoir, and illustrating the discharge control and closure valve of the present invention in closed disposition, and further illustrating, in phantom, the control and closure valve in the open disposition.

In accordance with the preferred embodiment of the present invention, and with particular attention being directed to the drawings, the toilet tank and operative assembly generally designed includes a tank or reservoir member 11 (normally fabricated of porcelain) and defining a water reservoir therewithin, and with a water supply line being coupled thereto as at 11A. The water supply line further includes a fill line 12, which operates off of the conventional ball cock assembly, controlled by a float-arm 13 with float 14 secured thereto at its distal end. Pivot means are provided at 15 in order to appropriately actuate the ball cock valve means, as is conventional in most of the commercially available devices of this type.

A fill line extends from the ball cock to stand-pipe 16 which receives a flow of fresh water from fill line 11A when the ball cock is open, and with the water being directed to a point in the discharge drain 18 and subsequently into the toilet bowl.

The present invention includes a stopper placed in the end of the fill line where it extends into the standpipe.

In order to appropriately control the discharge of water from reservoir 11 into the bowl, discharge drain 18 is provided with an upper closure surface controlled by discharge control and closure valve assembly 20. This assembly includes the discharge control and closure valve 22 designed in accordance with the present invention, and with the control and closure valve 22 being actuated upon demand by flexible link chain 21, which is coupled between control and closure valve 22 at point 21A and actuating arm 21B. Trip lever 21C is controllably utilized by the user and held in actuated position for as long as required for operating control and closure valve 22 in its demand mode.

Figure 2:
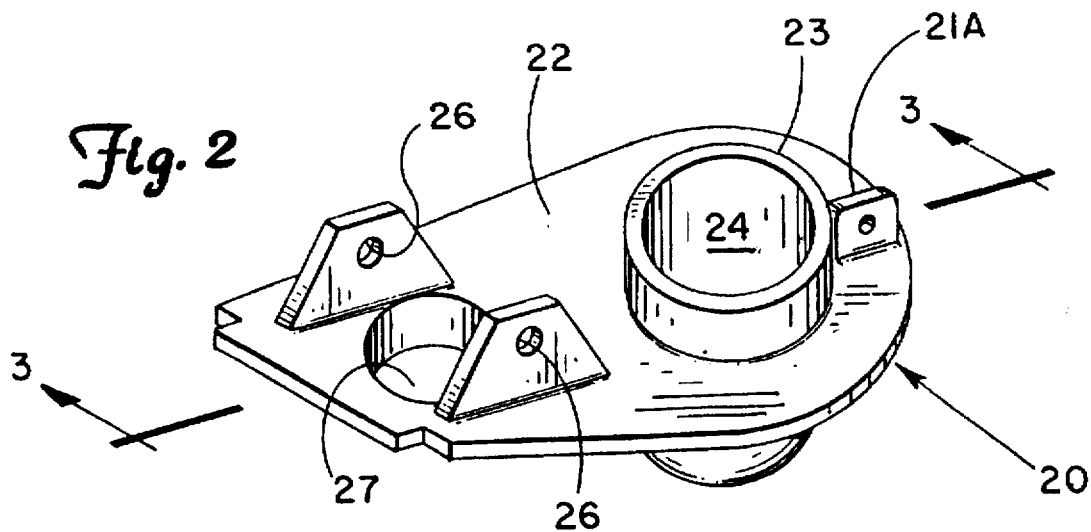
FIG. 2 is a detail perspective view of the discharge control and closure valve of the present invention, and being shown on a slightly enlarged scale.
Figure 3:
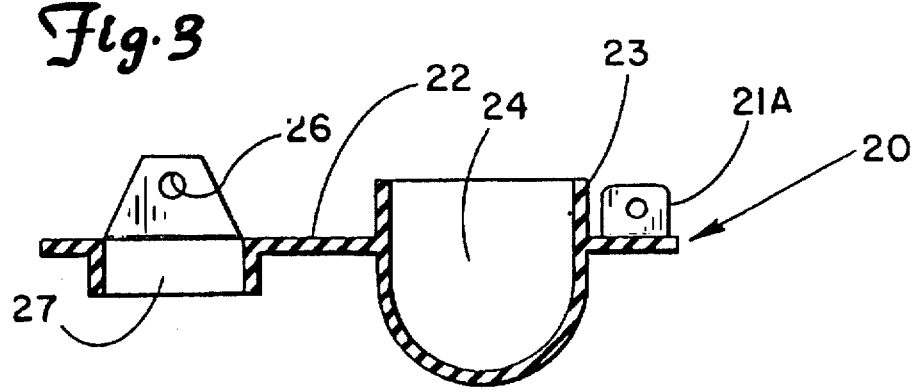
FIG. 3 is a vertical sectional view taken along the line and in the direction of the arrows 3—3 of FIG. 2, and with FIG. 3 also being shown on a slightly enlarged scale.
Figure 4:
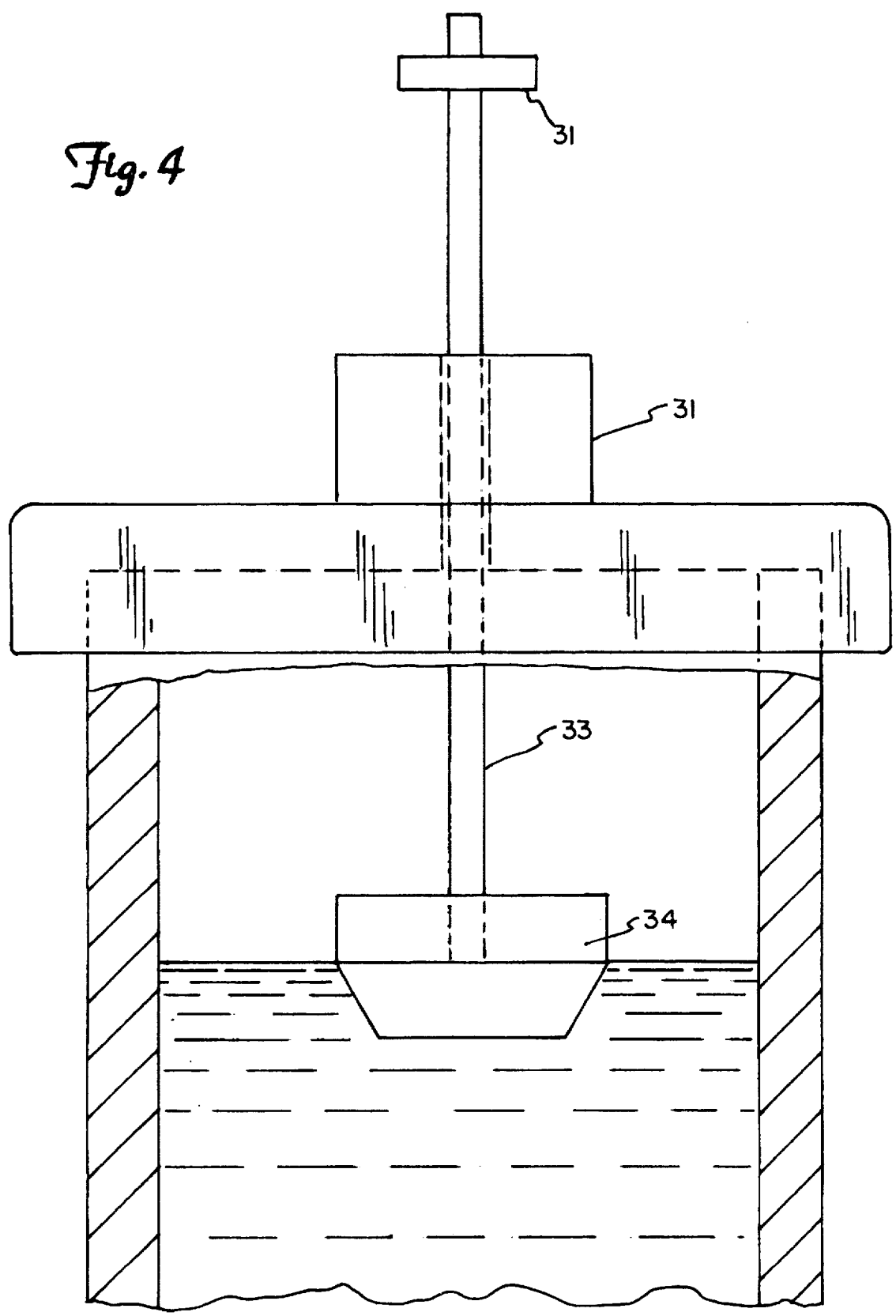
FIG. 4 is a front elevational view of the toilet tank water level guage.
Figure 5:
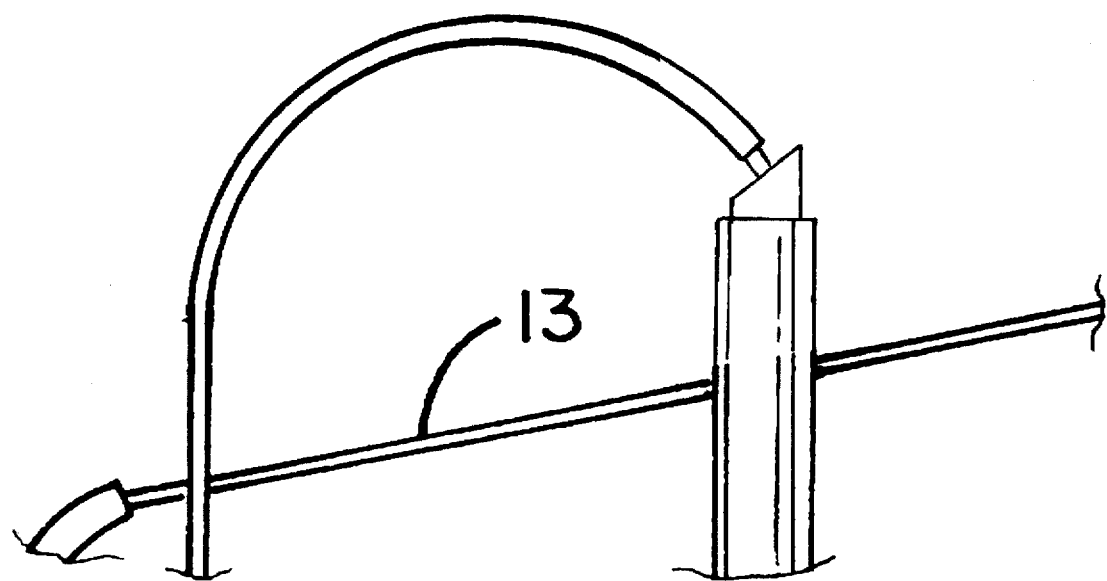
FIG. 5 is a front elevational view of a stopper installed into the end of the tubing that goes from the ballcock into the hole in the standpipe.

With attention now being directed to FIGS. 2 and 3 of the drawings, discharge control and closure valve body 22 has an annular sidewall arrangement 23 extending upwardly thereof about chamber 24. Chamber 24 has a generally cylindrical configuration with an open top and a closed bottom, and with the outer diameter of chamber 24 being such that the inner diameter of the discharge drain member 18 is generally immediately adjacent to the outer walls (OD) of chamber 24, with the bottom wall of chamber 24 extending into the discharge drain. The lower closed end of chamber 24 is, as indicted, in generally hemispherical configuration, and forms a continuum with the cylindrical walls at 23.

In order to provide for proper balance and closure of the discharge control and closure valve 22, the sidewalls extend upwardly from the surface 22 a sufficient distance so that an open-top chamber is provided to receive and retain a certain first quantity of water therewithin. This quantity of water is sufficient so that when the valve is pivoted upwardly for opening, the height of the chamber sidewalls is sufficient to retain at least about 70% of the volume of water therewithin, thus enhancing its ability to drop with gravity and provide for proper seating, sealing and closure of surfaces 22 about the upper open end of discharge drain 18. It will be appreciated, of course, that line 11A has an extension which normally extends beneath the reservoir 11 to a supply of water, while discharge drain member 18 will extend downwardly to meet with the inlet to the lower positioned toilet bowl.

With continued attention being directed to FIGS. 2 and 3, valve 22 includes a pair of pivotal members 26, through which pivotal secure members may be provided as diametrically opposed and outwardly extending members on fill-pipe 16. In addition, opening 27 is provided to surround pipe 16, and with sufficient clearance to permit appropriate opening of valve member 22 whenever arm 21 is actuated to lift chain 21 and valve 22 away from its seated disposition.

In order to provide the user of the device an indication of when to release handle 21C a water level gauge is provided. The gauge comprises a float 34 having an upstanding rod 33 attached thereto. The rod passes trough an opening in the lid of the toilet tank and through a rod guide 32 mounted on the lid and having an opening therein which is aligned with the opening in the tank lid. An adjustable rubber collar 31 is adjustably frictionally mounted on the end of the rod 33 opposite to the float. After determining the proper or desired amount of water to be flushed the user adjusts the rubber collar 31 along the rod 33 such that upon a subsequent flush when the rubber collar 31 abuts the rod guide 32 the determined proper amount of water has passed through the discharge drain 18 and the trip lever 21C can be released to assure the same amount of flush water passage on each subsequent flush.

I claim:

1. In combination with a toilet tank having a water reservoir covered by a tank lid, a water supply line coupled to said tank a discharge drain opening for delivering water from said reservoir to the toilet bowl disposed therebeneath, a ball cock valve controlling the flow, of water from said supply line to said reservoir, a stand-pipe fill tube extending from said ball cock valve to said stand-pipe and a water impervious discharge control and closure valve for controlling the flow of water from said reservoir to said discharge drain, the improvement comprising:

(a) said discharge control and closure valve having a generally cylindrical configuration with an open top and a closed bottom defining a water retaining chamber having an upstanding wall, and with the outer diameter of said chamber being such that the inner diameter of said discharge drain opening is immediately adjacent thereto when said valve is closed to define a sealing surface, (b) said discharge control and closure valve being adapted to pivot upwardly about pivot points disposed laterally away from said sealing surface, and with the height of said chamber being sufficient to retain at least about 70% of the volume of water of said chamber therewithin whenever said discharge control and closure valve is pivoted upwardly for opening said discharge drain opening;

(c) a stopper installed in an end of said fill tube so as to prevent at least a portion of fill water from passing therethrough;

(d) a water level indicator gauge comprising a float having one end of an upstanding rod attached thereto, the other end of said rod having an adjustable collar attached thereto;

(e) said tank lid being provided with an opening therethrough for passage of said rod and a rod guide in alignment with said opening, wherein said adjustable collar may be placed on said rod at a position such that upon descent of said float and rod with descent of water in said tank, said collar upon touching said rod guide will indicate the amount of water drained from said tank.

* * * * *